United States Patent
Tang et al.

(10) Patent No.: US 12,441,893 B2
(45) Date of Patent: Oct. 14, 2025

(54) METAL COATED WITH A FUNCTIONAL POLYPROPYLENE FILM

(71) Applicant: Dow Global Technologies LLC, Midland, MI (US)

(72) Inventors: Houxiang Tang, Midland, MI (US); David L. Malotky, Midland, MI (US); Nicholas B. Schaffer, Midland, MI (US); Hanze Ying, Midland, MI (US); Bernhard U. Kainz, Lauf (DE); Cynthia A. Stants, Coleman, MI (US); Luqing Qi, Midland, MI (US); Ray E. Drumright, Midland, MI (US); Jonathan F. Mason, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 18/251,777

(22) PCT Filed: Dec. 2, 2021

(86) PCT No.: PCT/US2021/061570
§ 371 (c)(1),
(2) Date: May 4, 2023

(87) PCT Pub. No.: WO2022/140033
PCT Pub. Date: Jun. 30, 2022

(65) Prior Publication Data
US 2024/0002673 A1  Jan. 4, 2024

Related U.S. Application Data

(60) Provisional application No. 63/128,309, filed on Dec. 21, 2020.

(51) Int. Cl.
| | | |
|---|---|---|
| *C09D 5/08* | (2006.01) |
| *C09D 5/02* | (2006.01) |
| *C09D 7/45* | (2018.01) |
| *C09D 7/63* | (2018.01) |
| *C09D 123/14* | (2006.01) |
| *C09D 123/30* | (2006.01) |

(52) U.S. Cl.
CPC ............ *C09D 5/08* (2013.01); *C09D 5/027* (2013.01); *C09D 7/45* (2018.01); *C09D 7/63* (2018.01); *C09D 123/14* (2013.01); *C09D 123/30* (2013.01)

(58) Field of Classification Search
CPC ... C09D 5/08; C09D 7/45; C09D 7/63; C09D 5/027; C09D 123/14; C09D 123/30
See application file for complete search history.

(56) References Cited

U.S. PATENT DOCUMENTS

| | | | |
|---|---|---|---|
| 6,166,118 A | 12/2000 | Hyche et al. |
| 8,394,884 B2 | 3/2013 | Kotori et al. |
| 8,779,053 B2 | 7/2014 | Lundgard et al. |
| 9,701,824 B2 | 7/2017 | Crimmins et al. |
| 2013/0059165 A1 | 3/2013 | Malotky et al. |
| 2016/0280951 A1* | 9/2016 | Drumright | C09J 123/10 |
| 2018/0044536 A1 | 2/2018 | Walia et al. |
| 2020/0123393 A1 | 4/2020 | Tang et al. |

FOREIGN PATENT DOCUMENTS

| | | |
|---|---|---|
| EP | 0972794 | 1/2000 |
| EP | 2245101 | 11/2010 |
| EP | 3115428 | 1/2017 |
| WO | 2012170241 | 12/2012 |

OTHER PUBLICATIONS

International Preliminary Report on Patentability from corresponding International Application No. PCT/US2021/061570 dated Jun. 13, 2023.

Search Report and Written Opinion from corresponding International Application No. PCT/US2021/061570.

* cited by examiner

*Primary Examiner* — Robert S Walters, Jr.
(74) *Attorney, Agent, or Firm* — Karl E. Stauss

(57) ABSTRACT

The present invention relates to an article comprising metal coated with an aqueous dispersion of polyolefin particles as well as metal coated with a polyolefin film arising from this dispersion. More particularly the polyolefin particles of the present invention are predominantly polypropylene particles.

11 Claims, No Drawings

METAL COATED WITH A FUNCTIONAL POLYPROPYLENE FILM

The present invention relates to an article comprising metal coated with an aqueous dispersion of polyolefin particles as well as metal coated with a polyolefin film arising from this dispersion. More particularly the polyolefin particles in the aqueous dispersion of the present invention are predominantly polypropylene particles.

The application of various treatment and pretreatment solutions to metals to retard or inhibit corrosion is well established. This is particularly true in the area of metal food and beverage cans, pails, and drums, as well as non-food metal containers. Coatings are used on the interior of such containers to prevent the contents (e.g., food or beverage) from contacting the metal of the container. Contact between the metal and the food or beverage as well as non-food substances can lead to corrosion of the metal container, which can then contaminate the food or beverage or the non-food contents of such metal containers. Corrosion is particularly problematic when food and beverage products are highly acidic and/or have a high salt content. Also, strong alkaline contents of non-food substances such as hair-dye may react with metal such as aluminum. The coatings applied for example, to the interior of food and beverage cans also helps prevent corrosion in the head space of the cans, which is the area between the fill line of the food product and the can lid. The coatings may also be applied to the outside of metal containers to provide protection against the external environment and/or to provide a decorative layer including fillers and/or pigments. In addition to corrosion protection, coatings for food and beverage cans should be non-toxic, inert, and if applied to the internal surface, should not adversely affect the taste, appearance (e.g., color of the food or beverage in the can), or contribute to contamination of the contents of the can. Resistance to "popping," "blushing," and/or "blistering" is also desired, especially during high temperature processing conditions (e.g., retort processing). Retort processing is the process where packaged food or beverages are sterilized as well as cooked, where necessary, to achieve safety and quality. During the retort process the sealed food or beverage cans with their content are sterilized at a temperature of about 121° C. or higher. Many coatings are unable to withstand such temperatures and then provide subsequent coating performance. There remains a need for coatings on metal substrates to achieve superior retort processing.

United States Patent Publication 2020/0123393 A1 discloses an aqueous dispersion and its use in coating a metal substrate, especially the coating of metal cans for food and beverage packaging, where the aqueous dispersion includes a solid content from 15 weight percent (wt. %) to 60 wt. % based on a total weight of the aqueous dispersion. The solid content includes a melt blend product having 15 to 60 wt. % of an acid functionalized polypropylene base polymer having a melting point of 155° C. to 1700° C.; 16 to 50 wt. % of a polypropylene copolymer having a density of less than 0.88 grams/cubic centimeter (g/cm$^3$); 5 to 20 wt. % of an acid functionalized polypropylene wax; and 15 to 30 wt. % of an acid functionalized polyolefin, where the wt. % is based on the total weight of the melt blend product and components of the melt blend product add to 100 wt. %. US Patent Publication 2020/0123393 A1 fails to disclose the use of fatty acid dispersants and the impact such dispersants have on formulating coatings on metal substrates.

U.S. Pat. No. 6,166,118 discloses emulsions of functionalized polyolefins for use in coatings including temporary metal coatings and paper coatings; where the functionalized polyolefin has a weight average molecular weight greater than 10,000, a fatty acid, and a base in an amount sufficient to neutralize the functionalized polyolefin and the fatty acid. U.S. Pat. No. 6,166,118 fails to disclose (a) using the combination of a high melting point and functionalized base resin, (b) using a blend of functionalized and unfunctionalized base resin, and (c) forming a retort resistant coated metal article.

U.S. Pat. No. 9,701,824 discloses polyolefin dispersion blends for paper coating applications, where the polyolefins comprise polyethylene or polypropylene resins and may include up to about 20 wt. % of any modified polyolefin having a melting point of 105° C. or higher. U.S. Pat. No. 9,701,824 fails to disclose metal coatings and how to meet the standards required of metal coatings.

The present invention provides a process for preparing a coated metal substrate comprising the steps of:
 a) applying onto a metal substrate a coating formulation derived from an aqueous dispersion composition comprising:
  i) 1 to 15 weight percent, based on the weight of polymer solids in the dispersion, a fatty acid dispersant of 14 to 60 carbon atoms with an acid value in the range of 60 to 250;
  ii) from greater than 25 weight percent to less than 70 weight percent, based on the weight of polymer solids in the dispersion, an acid functionalized propylene base copolymer with an acid value in the range of 0.5 to 20 and a melting point at or above 130° C. as determined by DSC;
  iii) 15 to 60 weight percent, based on the weight of polymer solids in the dispersion, a non-functionalized propylene-co-alkene base copolymer;
  iv) 2 to 15 weight percent, based on the weight of polymer solids in the dispersion, a functionalized polyolefin wax with an acid value in the range of 25 to less than 60; and
  v) a neutralizing agent which is an organic base or volatile base having a boiling point of less than 250° C.; and
 b) curing the composition by heating or allowing the composition to set to produce a cured film having a thickness in the range of 1 μm to 20 μm.

The present invention further provides a metal coated article made according to the process of the present invention.

The composition, which is an aqueous dispersion comprising the dispersant, the base polymer, the functionalized polyolefin wax, and the neutralizing agent may be prepared by a continuous or batch process. An example of a preferred continuous process is twin screw extrusion, as described in U.S. Pat. No. 8,722,787, Comparative Example E. A batch process can be carried out, for example, using a 2CV Helicone mixer, which is a conical batch mixer that uses dual intermeshing conical blades to mix high viscosity materials. The concentration of polymers in the aqueous dispersion is preferably in the range from 20, more preferably from 25, and most preferably from 30 weight percent, to preferably 60 and more preferably to 55 weight percent, based on the weight of water and the polymers combined.

Dispersant

The dispersant comprises a fatty acid of 14 to 60 carbon atoms with an acid value in the range of 60 to 250. The term "acid value" or "acid number" refers to the mass of potassium hydroxide (KOH) in milligrams that is required to neutralize one gram of copolymer and is determined by ASTM (D974). All individual values and subranges from 60 to 250 are included herein and disclosed herein. For example, the acid value can be from a lower limit of 60, 75, 80, 100, 120, or 150 to an upper limit of 250, 225, 200, or 175. For example, the acid value can be from 75 to 250; or in the alternative, from 80 to 250; or in the alternative, from 75 to 200; or in the alternative, from 100 to 250. The term "fatty acid" means a carboxylic acid comprising a long aliphatic chain which is either saturated or unsaturated. The fatty acid dispersant can contain linear, branched, cyclic, or aromatic structural segments, or combinations thereof. Suitable fatty acids include, but are not limited to, acids, anhydrides, and esters such as myristic acid, stearic acid, palmitic acid, behenic acid, oleic acid, tall oil, tall oil fatty acid, alkenylsuccinic anhydrides, monoesterified alkenylsuccinic anhydrides, and combinations thereof. The concentration of the fatty acid dispersant is preferably in the range of from 1 to 15 weight percent, based on the weight of polymer solids in the dispersion and preferably from 2 to 10 weight percent, based on the weight of polymer solids in the dispersion.

The dispersant may further comprise a high molecular weight acid functionalized polyolefin copolymer, where "high molecular weight" means a weight average molecular weight, as determined by GPC, of at least 10,000. The acid functionalized polyolefin copolymer dispersant typically comprises structural units of ethylene and a carboxylic acid monomer, such as acrylic acid, methacrylic acid, or itaconic acid, such that the dispersant is a copolymer comprising structural units of ethylene and acrylic acid (EAA), or ethylene and methacrylic acid (EMAA). The term "structural unit" of the named monomer refers to the remnant of the monomer after polymerization. For example, a structural unit of methacrylic acid is as illustrated:

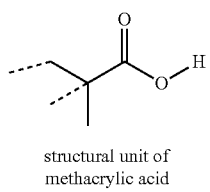

structural unit of
methacrylic acid where the dotted lines represent the points of attachment of the structural unit to the polymer backbone.

The acid functionalized polyolefin copolymer dispersant has a melt flow index in the range of from 50 to 2000 g/10 min at 190° 22.16 kg (according to ASTM D1238) and the weight-to-weight ratio of structural units of ethylene to carboxylic acid monomer is in the range of from 95:5, preferably from 90:10, and more preferably from 85:15 weight percent; to 70:30, and preferably to 75:25 weight percent, based on the weight of the dispersant copolymer. The polymeric dispersant has an acid number between 60 and 250. Preferably no additional acid functionalized polyolefin copolymer dispersant is used to prepare the aqueous dispersion of polyolefin particles. However, if added, the concentration of the acid functionalized polyolefin copolymer dispersant, is in the range of from 5-30 weight percent, based on the weight of polymer solids in the dispersion, more preferably up to 15 weight percent, based on the weight of polymer solids in the dispersion; provided that the concentration of the dispersant in the composition is sufficient to yield a cured film on a metal substrate with a post retort adhesion (measured at 135° C./60 min, 2% lactic acid) of 4B, more preferably 5B. A suitable commercially available acid functionalized polyolefin copolymer dispersant includes NUCREL™ 960 (an EMAA copolymer with an acid value around 98) or Primacor 5980i (an EAA copolymer with an acid value around 155).

Base Polymer

The base polymer or base copolymer comprises both a non-functionalized polypropylene copolymer and a high melting point acid functionalized propylene-based polyolefin copolymer. The terms "polypropylene copolymer" and "propylene-based polyolefin copolymer" each means that the repeating polymeric chain comprises at least 60 weight percent (wt. %) of structural units derived from propylene and from 0.1 to 40 wt. % of structural units derived from one or more alpha-olefin comonomers. Examples of comonomers that can be utilized to manufacture the polypropylene copolymer or propylene-based polyolefin copolymer are C2, and C4 to C10 alpha-olefins. All individual values and subranges from 0.1 to 40 wt. % are included herein and disclosed herein. For example, the wt. % of units derived from one or more alpha-olefin comonomers can be from a lower limit of 0.1, 1, 3, 4, 5, 7, or 9 wt. % to an upper limit of 40, 35, 30, 27, 20, 15, 12, or 9 wt. %. For example, the polypropylene copolymer can comprise from 0.eal to 35 wt. % of structural units derived from one or more alpha-olefin comonomers; or in the alternative, the polypropylene copolymer can comprise from 1 to 30 wt. % of structural units derived from one or more alpha-olefin comonomers; or in the alternative, the polypropylene copolymer can comprise from 3 to 27 wt. % of structural units derived from one or more alpha-olefin comonomers; or in the alternative, the polypropylene copolymer can comprise from 3 to 20 wt. % of structural units derived from one or more alpha-olefin comonomers; or in the alternative, the polypropylene copolymer can comprises from 3 to 15 wt. % of structural units derived from one or more alpha-olefin comonomers. Embodiments of the present disclosure provide that the non-functional polypropylene copolymer has a density of less than 0.900 g/cm$^3$ per ASTM D792. For example, the non-functional polypropylene copolymer can have a density in a range of 0.858 g/cm$^3$ to 0.891 g/cm$^3$. All individual values and subranges from 0.858 g/cm$^3$ to 0.891 g/cm$^3$ are included herein and disclosed herein. For example, the non-functional polypropylene copolymer can have a density from a lower limit of 0.858, 0.860 or 0.862 g/cm$^3$ to an upper limit of 0.891, 0.878 or 0.876 g/cm$^3$. Embodiments of the present disclosure provide that the high melting point acid functionalized propylene-based polyolefin copolymer has a density of at least 0.900 g/cm$^3$ per ASTM D792. For example, the high melting point acid functionalized propylene-based polyolefin copolymer can have a density in a range of 0.900 to 0.910 g/cm$^3$, with all individual values and subranges included herein and disclosed herein.

The non-functionalized polypropylene copolymer base polymer comprises non-functionalized propylene-co-alkene copolymers, wherein the weight-to-weight ratio of the structural units of propylene to alkene is in the range of from 99.8:0.2, preferably from 99.7:0.3; and more preferably from 99.6:0.4; to 50:50, more preferably to 60:40; and most preferably to 65:35. Preferred non-functionalized propylene-co-alkene copolymers include propylene-co-ethylene, propylene-co-octene, propylene-co-butene, propylene-co-hexene copolymers, or mixtures thereof. Commercial examples of non-functionalized polypropylene copolymer base polymers include: VERSIFY™ 4200 (a propylene-ethylene copolymer having a melt index (230° C./2.16 Kg)

of 25 g/10 min per ASTM D1238, a density of 0.876 g/cm³ per ASTM D792, and a melting point of 84° C.), and VERSIFY™ 3000 (a propylene-ethylene copolymer having a melt index (230° C./2.16 Kg) of 8 g/10 min per ASTM D1238, density of 0.891 g/cm³ per ASTM D792, and a melting point of 108° C.; all available from Dow, Inc. or its affiliates. The concentration of non-functionalized polypropylene copolymer base polymer is sufficient to yield a cured film on a metal substrate with a post retort adhesion (measured at 135° C./60 min, 2% lactic acid) of 4B, more preferably 5B; preferably up to 60 weight percent, based on the weight of polymer solids in the dispersion, more preferably up to 50 weight percent, preferably at least 15 weight percent and more preferably at least 30 weight percent. Preferably, the concentration of non-functionalized polypropylene copolymer base polymer is preferably in the range of from 15, more preferably from 30, to 60, more preferably to 50 weight percent, based on the weight of polymer solids in the dispersion.

The high melting point acid functionalized propylene-based polyolefin base polymer is an acid or anhydride functionalized propylene homopolymer or copolymer with an acid value in the range of 0.5 to 20 and a melting point at or above 130° C. as determined by DSC as described in the experimental and examples section. The concentration of the high melting point acid functionalized propylene-based polyolefin base polymer is sufficient to yield a cured film on a metal substrate with a post retort adhesion (measured at 135° C./60 min, 2% lactic acid) of 4B, more preferably 5B; preferably lower than 70 weight percent, based on the weight of polymer solids in the dispersion, more preferably lower than 65 weight percent, preferably greater than 25 weight percent and more preferably greater than 30 weight percent. Preferably, the concentration of the high melting point acid functionalized propylene-based polyolefin base polymer is in the range of greater than 25 to less than 70 weight percent, based on the weight of polymer solids in the dispersion. Commercial examples of high melting point acid functionalized propylene-based polyolefin base polymer include: Fusabond P613 (an anhydride modified polypropylene having a melt index (190° C./1.0 Kg) of 49 g/10 min per ASTM D1238, a density of 0.903 g/cm³ per ASTM D792, and a melting point of 162° C. per ASTMD3418), and Fusabond P353 (an anhydride modified polypropylene having a melt index (160° C./325 g) of 22 g/10 min per ASTM D1238, density of 0.904 g/cm³ per ASTM D792, and a melting point of 135° C. per ASTM D3418); all available from Dow, Inc. or its affiliates.

Wax

The functionalized polyolefin wax has an acid value in the range of 20 to less than 60, more preferably from 25 to less than 60. All individual values and subranges from 20 to less than 60 are included herein and disclosed herein. The functionalized polyolefin wax of the present disclosure can include any material having the desired acid number (AN) and the desired melt index of from 500 to 5,000,000, preferably, 1000 or more, grams of polymer melt passing in 10 minutes through a heated syringe or cylinder at 190° C. with a plunger loaded with 2.16 kg, or, alternatively, having a viscosity of from 75 to 10,000, preferably, 150 or higher, Pa s taken via the DIN 53019 Method (2010) at 170° C. for a polymer wherein more than 50 wt. % of the polymer comprises propylene in polymerized form that can improve compatibility between the acid functionalized polypropylene base polymer and the optional acid functionalized polyolefin copolymer dispersant of the present disclosure. The melt index of the acid functionalized polypropylene wax will be significantly higher than the corresponding measure for both the polypropylene copolymer and the acid functionalized polypropylene base polymer, and may be so high that viscosity may be a better practical measure to define the acid functionalized polyolefin wax. Suitable acid functionalized polyolefin wax may comprise an acid functional modified polypropylene, preferably a maleic anhydride polypropylene copolymer, maleic anhydride grafted polypropylene, or a maleic anhydride modified polypropylene wax.

The concentration of the functionalized polyolefin wax is sufficient to yield a cured film on a metal substrate with a post retort adhesion (measured at 135° C./60 min, 2% lactic acid) of 4B, more preferably 5B; preferably at least 2 weight percent, based on the weight of polymer solids in the dispersion, and preferably up to 15 weight percent. Preferably, the concentration of the functionalized polyolefin wax is in the range of 2 to 15 weight percent, based on the weight of polymer solids in the dispersion. Commercially available functionalized polyolefin waxes include: LICOCENE™ PP MS 641 (a maleic anhydride grafted polypropylene wax (sometimes referred to as MA-g-PP), having acid value of 41 according to QM-AA-634, density 0.93 g/cm3 per ISO 1183, viscosity 1100 mPa·s per QM-AA-158 at 170° C.), available from Clariant Corporation or its affiliates. For direct comparison, the melting flow index of Licocene PP MS 641 is estimated to be >700 g/10 min (190 C/2.16 kg) per method described in a reference article (Dutta A. On viscosity-melt flow index relationship, Rheol Acta 23: 565-569, 1984).

The dispersion solid can further optionally comprise 0.1 to 5% by weight of unfunctionalized wax such as POLY-WAX™ 655 polyethylene available from Baker Hughes, Inc. or its affiliates.

Neutralizing Agent

The neutralizing agent can be an organic base or volatile base having a boiling point of less than 250° C. Suitable organic bases or volatile base include ammonia or an amine; examples of suitable amines include N,N-dimethylethanolamine (DMEA), diethylamine, and morpholine.

Preferably the neutralizing agent is ammonia or dimethylethanolamine (DMEA). The concentration of neutralizing agent is sufficiently high to neutralize at least half of the carboxylic acid groups present in the dispersion composition. For example, if the dispersion composition comprises 0.05 mol of carboxylic acid groups in a given mass, at least 0.025 mol of a base such as DMEA would be required. Thus, the molar ratio of basic functionality in the neutralizing agent to carboxylic acid groups in the dispersion composition is at least 0.5:1. Preferably the ratio is in the range of from 0.7:1, more preferably from 0.9:1, to 2.5:1, to preferably 2:1, and more preferably to 1.7:1.

Other Components

The composition may optionally be mixed or formulated with one or more additional components or additives as those skilled in the art can appreciate. Examples of additives include, but are not limited to, crosslinking agents, other water-based dispersions, resin binders (including, but not limited to, epoxy, urethane, polyester, polyvinyl chloride containing organosols/vinyls, phenolic, alkyd, oleo resin, acrylic resin, and the like), pigments, fillers, wetting agents, defoamers, solvents, rheology modifiers, surfactants, antioxidants, catalysts, flow agents, release agents, slip agents, lubricants, anti-blocking agents, additives to mask sulfur staining, anti-settling agents, UV stabilizers, adhesion promoters, corrosion inhibitors, preservatives, and other additives to improve aesthetic and performance attributes of the coated metal. Different amounts of the various additives may be utilized for different coating applications.

As mentioned, the coating compositions disclosed herein may be applied to a metal substrate. Examples of the metal substrate include, but are not limited to, metal sheet or coil, beverage cans, food cans; aerosol containers such as those for non-food products, e.g. hair spray, hair dye, or color spray lacquers; drums; kegs; pails; decorative tins; open trays; tubes; bottles; monoblocs; caps, lids such as thin aluminum foil based lids for yogurt and butter containers, or crown corks; closures for glass jars and bottles such as roll-on closures, vacuum closures, pilfer-proof closures, easy peel lids for can closures, and easy open end or conventional ends for cans, among others. Cans, to which the coating compositions disclosed herein may be applied, can be 2-piece cans or 3-piece cans. Beverage cans include, but are not limited to, beer cans, carbonated soft drink cans, energy drink cans, isotonic drink cans, water cans, juice cans, tea cans, coffee cans, milk cans, and the like. Food cans include, but are not limited to, vegetable cans, fruit cans, meat cans, soup cans, ready meal cans, fish cans, edible oil cans, sauce cans and the like. Such cans may have various shapes. For example, such can may have a cylindrical shape, cubical, spherical, semi-spherical, bottle shape, elongated cubical shape, shallow or tall shape, round or rectangular shape or other suitable shape, or a combination thereof. Examples of the metal include, but are not limited to, aluminum and aluminum alloys, steel, electrolytic tinplate cold rolled low carbon mild steel, electrolytic chromium/chromium oxide coated cold rolled low carbon mild steel, and other pre-treated steels. Pretreatment may include, but is not limited to, treatment with phosphoric acid, zirconium phosphate, chromium phosphate, Cr (III) and Cr (VI) compounds and the like as well as silanes for reasons such as primary corrosion protection and improved adhesion. The metal substrate may comprise a sheet, strip or a coil. The substrate may be pre-coated with one or more pre-coating compositions. Such pre-coating compositions include, but are not limited to, one or more resin binders, one or more resin crosslinkers, one or more solvents, one or more additives, and one or more pigments. Examples of resin binders include, but are not limited to, epoxy, polyurethane, polyester, polyvinyl chloride containing organosols/vinyls, phenolic, alkyd, oleoresin, acrylic resin, coatings derived from polyolefin dispersions and the like. Examples crosslinkers include, but are not limited to hydroxyalkylamide, phenol-formaldehyde resins; amino-formaldehyde resins including but not limited to urea-formaldehyde, melamine formaldehyde, benzoguanamine formaldehyde; anhydride resins, blocked isocyanate resins and epoxy groups containing resins, including but not limited to, epoxy resins, epoxy groups containing polyesters, acrylic resins, vinyl resins or the like. Examples of solvents and thinners include, but are not limited to, glycol ethers, alcohols, aromatics, e.g. aromatic hydrocarbons, white spirit, branched ketones and esters. Examples of additives include, but are not limited to, catalysts, lubricants, wetting agents, defoamers, flow agents, release agents, slip agents, anti-blocking agents, additives to mask sulfur staining, pigment wetting/dispersion agents, anti-settling agents, UV stabilizers, adhesion promoters. Pigments include, but are not limited to titanium dioxide, carbon black, zinc oxide, aluminum oxide, zinc and aluminum. The substrate may also be pre-coated with one or more pre-coated laminate compositions. Such compositions may, for example, include polyethylene, polypropylene, or polyester compositions, and may be applied either as a film via film lamination process or melt-extrusion coating process onto the metal substrate.

The metal substrate may be formed via stamping, drawing, redrawing, wall ironing, bending, beading, embossing, debossing, flanging, necking, stretching, blow-stretching and/or other suitable conventional methods. Such methods are known to those having ordinary skill in the art. According to a number of embodiments, the coating compositions may, for example, be applied to the metal substrate, e.g. metal sheet or metal foil, and then the coated substrate may be formed into a coated article, e.g., a container device such as metal can or a coated closure device. According to a number of embodiments, the substrate may be formed into a container, e.g., a container device or a closure device, and then the container device or the closure device can be coated with the coating compositions to form the coated article. The coating compositions may be applied by various methods. For example, via roller coating, spray coating, powder coating, dip coating, electrodeposition coating, printing, wash coating, flow coating, draw down coating, and/or curtain coating. The coating, i.e. the coating composition applied to the metal substrate, may have a thickness in the range of 0.01 micrometers (µm) to 2 millimeters (mm). All individual values and subranges from 0.01 µm to 2 mm are included herein and disclosed herein. For example, the coating may have a thickness from a lower limit of 0.01 µm, 0.05 µm, or 1 µm, to an upper limit of 2 mm, 1.5 mm, or 1 mm. For example, the coating may have a thickness 0.01 µm to 2 mm; 0.05 µm to 1.5 mm; or in the alternative, 0.1 µm to 1 mm. According to a number of embodiments, the coating may have a thickness in a range of 5 µm to 50 µm, preferably 1 µm to 20 µm, and more preferably 7 µm to 10 µm. Coatings may also be put on top of each other as a multilayer coating.

The coating composition applied to the substrate may be cured, e.g., to form a cured coating. The curing process can comprise drying, e.g., air drying, convection oven drying, hot air drying, and/or infrared oven drying, among others. According to a number of embodiments, the curing can include radiation cure, e.g. electron-beam cure. The coating compositions applied to the substrate may be cured at a metal temperature in the range of 1400° C. to 375° C. for a period of less than 60 minutes, for example, less than 40 minutes, less than 30 minutes, less than 20 minutes, less than 10 minutes, less than 5 minutes, less than 2 minutes, less than 1 minute, or less than 20 seconds. All individual values and subranges from 140° C. to 375° C. are included herein and disclosed herein. For example, the coating compositions applied to the substrate may be cured at a metal temperature in the range of 1600° C. to 2600° C. for a period of less than 60 minutes, for example, less than 40 minutes, less than 20 minutes, less than 10 minutes, less than 5 minutes, less than 2 minutes, or less than 1 minute, or in the alternative, the coating composition applied to the substrate may be cured at a metal temperature in the range of 180° C. to 2350° C. for a period of less than 60 minutes, for example, less than 40 minutes, less than 10 minutes, less than 5 minutes, less than 2 minutes, or less than 1 minute.

As mentioned, for some coating applications, it is desirable that a coated article simultaneously provide performance characteristics, such as particular mechanical and chemical resistance properties and particular appearance properties. A particular mechanical property, desirable for some coating applications, is a Konig hardness value, e.g., Konig hardness values of greater than 70 seconds. Particular chemical resistance properties, desirable for some coating applications, include methyl ethyl ketone (MEK) double rub values, e.g., MEK double rub values of 200 or greater are desirable for some coating applications; passing appearance ratings following retort, e.g., 2% lactic acid solution, 3% acetic acid solution, and 3% citric acid solution.

Experimental Preparation and Testing Methods

Dispersion Preparation

Aqueous polyolefin dispersions (POD) are made according to the procedures in the Examples. The degree of neutralization (DoN) expressed in percentage of a polyolefin dispersion is determined according to the equation below:

$$DoN = \frac{56000W}{E_B \sum_i A_i \omega_i} \times 100$$

Where W is the weight of the base added in grams, $E_B$ is the equivalent weight of the base, $A_i$ is the acid number of the $i^{th}$ component in unit of mgKOH/g and the $\omega_i$ is the weight fraction of the $i^{th}$ component in POD dispersion solid.

Coating Formulation and Preparation

When POD based can coating formulations are prepared, aqueous and/or water soluble components are added to the POD dispersion before solvent borne and/or components insoluble in water are added. The pH of aqueous components is generally adjusted to a level similar to that of the POD dispersion, typically 9-10 by using basic water (e.g. 0.3% dimethylethanol amine (DMEA) dissolved in DI water). Primid™ QM-1260, available from EMS-Chemie AG is a hydroxyalkylamide compound derived from adipic acid and di-isopropanolamine, and is used as crosslinker for the acid functionality in the POD resin blend. The level of Primid™ QM-1260 is calculated according to the desired equivalence of the acid functionality using the following equation:

$$W = \frac{\sum_i A_i \omega_i}{56000} \times 94 \times 100 \times E$$

where W is the weight of Primid™ QM-1260 per 100 g resin blend. $A_i$ is acid number of the ith component in resin blend expressed in mg KOH/g, 0 is weight fraction of the ith component, 94 is the equivalent molecular weight of Primid™ QM-1260 hydroxyl groups and E is the design equivalence of Primid™ QM-1260 in the formulation recipe. Typically, Primid™ QM-1260 is added after dissolving it into basic water at 30 wt % concentration.

0.25 equivalence of Primid™ QM-1260 with respect to the total acid functionality is added to example POD coating formulations included in this filing. Acrysol™ ASE 75 Thickener, an acid containing, acrylic emulsion copolymer available from Dow, Inc., is added at 1% of the total formulation weight to adjust the formulation viscosity. All the formulations further contain 1/1 mixture of butanol and butyl CELLOSOLVE™, a fast-evaporating glycol ether available from Dow, Inc., at 0.4 ratio to the POD solid content. All the example formulations have a recipe solid content of 26 wt %.

Metal Coated Sample Preparation

Coating formulations are typically aged at room temperature at least overnight before coated substrates are prepared. Drawdown coatings on a substrate are prepared with a wire wound drawdown bar (typically #16) on a tinplate substrate (0.25 #Bright T-1 measuring 0.009×4"×12") supplied by Lakeside Metal. Unless noted otherwise, the coating was cured in a Despatch brand oven (serial #183952) at 205° C. for 4 minutes. The dry coating thickness is typically within the range of 7-10 μm (0.3-0.4 mil).

DSC Standard Method

Differential Scanning Calorimetry results are determined using a TA Instruments model Q1000 DSC equipped with an RCS cooling accessory and an autosampler. A nitrogen purge gas flow of 50 ml/min is used. The sample is pressed into a thin film and melted in the press at about 1750° C. and then air-cooled to room temperature (250° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 1800° C. and held isothermal for 3 minutes in order to remove any previous thermal history. The sample is then cooled to −90° C. at 100° C./min cooling rate and held at −90° C. for 3 minutes. The sample is then heated to 180° C. at 10° C./min. heating rate. The cooling and second heating curves are recorded.

The DSC melting peak temperature is measured as the maximum in heat flow rate (W/g) with respect to the linear baseline drawn between −30° C. and end of melting. The heat of fusion is measured as the area under the melting curve between −30° C. and the end of melting using a linear baseline. For the ethylene-based materials, the total percent crystallinity is equal to 100*enthalpy of sample/enthalpy of PE crystal where the enthalpy of a perfect polyethylene crystal is equal to 292 J/g as reported in Macromolelcular Physics, Vol. 1, Academic Press, New York, 1973, p. 154. For the propylene-based materials, The total percent crystallinity is equal to 100*enthalpy of sample/enthalpy of PP crystal where the enthalpy of a perfect polypropylene crystal is equal to 165 J/g as reported P. Edward, J. R. Moore, Polypropylene Handbook, Hanser Publisher, Cincinnati 1996.

Retort Tests

Tuttnauer™ EZ10 autoclave or similar autoclaves were used for the retort test. 2"×3" (2 inch×3 inch) strips cut from coated panels were put into a glass beaker that was half filled with food simulant. The beakers were covered with aluminum foil and then treated in the autoclave at 135° C. for 60 min. The autoclave was allowed to cool to 60° C. before it was opened and test panels removed. The test panels were rinsed and patted dry and then subjected to a cross-cut adhesion test in the area immersed in the simulant within 30 minutes after being removed from the autoclave. 2% lactic acid solution in deionized water was used as simulant for the examples disclosed.

Crosshatch Adhesion Test

The crosshatch adhesion was measured according to ASTM D 3359-09. The "B" method has been used because the coating thickness is less than 5 mils in thickness. In this test, a square lattice pattern is made with 10 cuts in each direction with 1 mm distance between two neighboring cuts. A pressure-sensitive tape is applied over the lattice and then removed. The adhesion is evaluated according to the following scale:

5B: the edges of the cuts are completely smooth; none of the squares of the lattice is detached.

4B: small flakes of the coating are detached at intersections; less than 5% of the area is affected.

3B: small flakes of the coating are detached along edges and at intersections of cuts. The area affected is 5 to 15% of the lattice.

2B: the coating has flaked along the edges and on parts of the squares. The area affected is 15 to 35% of the lattice.

1B: the coating has flaked along the edges of cuts in large ribbons, and whole squares have detached. The area affected is 35 to 65% of the lattice.

OB: flaking and detachment worse than Grade 1.

Table 1 shows the materials used in preparing polyolefin dispersions.

TABLE 1

POD Materials

| Material/Shorthand | Description/Source | Melting point (° C.) | Acid number (mg KOH/g) | Density (g/cm³) |
|---|---|---|---|---|
| Esenttia ™ 35R80/ PP35R80 | Polypropylene random copolymer/ Polipropileno del Caribe S.A. | 152 | 0 | 0.90 |
| Polypropylene H739-35N/ H739 | Polypropylene/Dow, Inc. or its Affiliates ("Dow") | 165 | 0 | 0.90 |
| FUSABOND ® P353D/ P353 | Acid functionalized polypropylene/ Dow | 135 | 13 | 0.90 |
| FUSABOND ® P613/ P613 | Acid functionalized polypropylene/ Dow | 162 | 4.5 | 0.90 |
| VERSIFY ™ 4200/ V4200 | Polypropylene copolymer/Dow | 84 | 0 | 0.876 |
| VERSIFY ™ 3000/ V3000 | Polypropylene copolymer/Dow | 108 | 0 | 0.888 |
| LICOCENE ® PP MS 641/ Lico641 | Acid functionalized polypropylene wax/Clariant | 138 | 43 | 0.91 |
| PRIMACOR ® 5980i/ P5980i | Ethylene acrylic acid copolymer/ Dow | 77 | 145 | 0.958 |
| Nucrel ™ 960/N960 | Ethylene methacrylic acid copolymer/Dow | 100 | 91 | 0.94 |
| Polywax ™ 655/PW655 | Polyethylene wax/ Baker Hughes | 99 | 0 | 0.95 |
| UNICID ™ 350 acid/U350 | 25-50 carbon linear primary carboxylic acid/Baker Hughes | 92 | 120 | N/A |
| Oleic acid/OA | $C_{18}H_{34}O_2$/Univar (Eastman) | 13 | 198 | 0.90 |
| Amplify ™ GR-204/GR-204 | Maleic anhydride modified HDPE/Dow | 127 | 12 | 0.954 |
| HDPE DMDA 8940/ DMDA 8940 | High density polyethylene/Dow | 129 | 0 | 0.95 |
| Licocene ™ PE MS 431/ Lico 431 | Maleic anhydride modified polyethylene wax/Clariant | 121 | 46 | N/A |

EXAMPLES

Example 1—Preparation of an Aqueous Dispersion of Polypropylene—P613 Base Polymer, V4200 Base Polymer, Wax, Dispersant at a 32:51:10:7 w/w/w/w Ratio Add P613 at 24.2 grams per minute, V4200 at 38.6 grams per minute, Lico641 at 7.6 grams per minute and U350 at 5.3 grams per minute into a 25 mm diameter twin screw extruder using a controlled rate feeder to forward and melt blend the components. The extruder temperature profile was ramped up to approximately 170° C. Water and base (dimethyletha-nolamine/DMEA) as a neutralizing agent were fed to the extruder at 5.9 and 3 grams per minute respectively. Dilution water was fed via one pump into a dilution zone of the extruder at a rate of 90 grams per minute. The extruder temperature profile was cooled back down to a temperature below 100° C. by the end of the extruder. The extruder speed was approximately 450 rpm. At the extruder outlet, a back-pressure regulator was used to adjust to a suitable pressure inside the extruder barrel to reduce steam formation. The resulting aqueous dispersion was filtered through a 100 micron filter. The remaining dispersion examples and comparative dispersion examples shown in Table 2 were prepared according to the procedure of Dispersion Example 1, but utilize the components listed in Table 2. The solids content of the aqueous dispersion examples and comparative examples listed in Table 2 was measured using an infrared solids analyzer; and the particle size of the solids particles of the aqueous dispersion examples and comparative examples in Table 2 was measured using a COULTER™ LS-230 particle size analyzer (Beckman Coulter Corporation, Fullerton, CA). The solids content ranges from 30-50 wt. % and the average particle size (PS) of the solids particles of the dispersions ranges from 10 nanometers to 10 micrometers. Table 2 also shows the post retort adhesion test results for each metal coated sample as described in the Experimental Preparation and Testing Methods. PP stands for polypropylene, PE stands for polyethylene, HDPE stands for high density polyethylene.

TABLE 2

Post Retort Adhesion of Formulated Polyolefin Dispersion Derived Coatings Coated on Tin Plate

| Example ID | POD solid Composition (weight ratio) | Comment | Post retort adhesion (135° C./60 min, 2% lactic acid) |
|---|---|---|---|
| Example-1 | (32/51/10/7) P613/V4200/Lico641/U350 with DMEA 150% DoN | | 5B |
| Example-2 | (39/44/7/7/3) P613/V4200/Lico641/P5980i/U350 with DMEA 150% DoN | | 5B |
| Example-3 | (32/51/10/7) P613/V4200/Lico641/OA with DMEA 150% DoN | | 5B |
| Example-4 | (45/41/7/7) P613/V4200/Lico641/OA with DMEA 150 DoN | | 5B |
| Example-5 | (55/31/7/7) P613/V4200/Lico641/OA with DMEA 150 DoN | | 5B |
| Example 6 | (65/21/7/7) P613/V4200/Lico641/OA with DMEA 150 DoN | | 5B |
| Example 7 | (32/51/10/7) P353/V4200/Lico641/U350 with DMEA 150% DoN | | 5B |
| Example 8 | (32/51/10/7) P613/V3000/Lico641/OA with DMEA 150% DoN | | 5B |
| Example 9 | (35/52/7/6) P613/V4200/Lico641/OA with NH3 220% DoN | | 5B |
| Example 10 | 35/42/6/8/7/2 P613/V4200/OA/N960/Lico641/PW655 with DMEA 150% DoN | | 5B |
| Comparative example A | (32/51/10/7) PP35R80/V4200/Lico641/U350 with DMEA 150% DoN | Non-functional low melting point PP base. | 0B |
| Comparative example B | (75/11/7/7) P613/V4200/Lico641/OA with DMEA 150% DoN | High P613 loading leads to poor performance | 0B |
| Comparative example C | 11/75/7/7 P613/V4200/Lico641/OA with DMEA 150% DoN | Low P613 loading leads to poorer retort performance than Dispersion example 9 | 3B |
| Comparative dispersion example D | (11/75/7/7) GR 204/DMDA 8940/Lico431/OA with DMEA 150% DoN | HDPE POD has poorer retort performance than PP Comparative C | 0B |
| Comparative dispersion example E | (32/51/10/7) H739/V4200/Lico641/OA with DMEA 150% DoN | High melting point non-functional PP leads to poorer performance than Dispersion example 1 | 0B |
| Comparative dispersion example F | 25/61/7/7 P613/V4200/Lico641/OA with DMEA 150% DoN | Low P613 loading leads to poorer retort performance than Dispersion example 3 | 2B |

The invention claimed is:

1. A process for preparing a coated metal substrate comprising the steps of:
    a) applying onto a metal substrate an aqueous dispersion composition consisting of:
        i) 1 to 15 weight percent, based on the weight of polymer solids in the dispersion, a fatty acid dispersant of 14 to 60 carbon atoms with an acid value in the range of 60 to 250;
        ii) from greater than 25 weight percent to less than 70 weight percent, based on the weight of polymer solids in the dispersion, an acid functionalized propylene base copolymer with an acid value in the range of 0.5 to 20 and a melting point at or above 130° C. as determined by DSC;
        iii) 15 to 60 weight percent, based on the weight of polymer solids in the dispersion, a non-functionalized propylene-co-alkene base copolymer;
        iv) 2 to 15 weight percent, based on the weight of polymer solids in the dispersion, a functionalized polyolefin wax with an acid value in the range of 25 to less than 60;
        v) a neutralizing agent which is an organic base or volatile base having a boiling point of less than 250° C.; and vi) water; and b) curing the composition by heating or allowing the composition to set to produce a cured film having a thickness in the range of 1 μm to 20 μm.

2. The process of claim 1 wherein the cured film has a thickness in the range of from 2 μm to 10 μm.

3. The process of claim 1 wherein the fatty acid dispersant is from 2 to 10 weight percent, based on the weight of polymer solids in the dispersion.

4. The process of claim 1 wherein the fatty acid dispersant is less than 10 weight percent, based on the weight of polymer solids in the dispersion.

5. A metal coated article made according to the process of claim 1.

6. The article of claim 5 wherein the metal coated article is part of a beverage can or food can.

7. A metal coated article made according to the process of claim 2.

8. A metal coated article made according to the process of claim 3.

9. A metal coated article made according to the process of claim 4.

10. A process for preparing a coated metal substrate comprising the steps of:

a) applying onto a metal substrate an aqueous dispersion composition consisting of:

i) 1 to 15 weight percent, based on the weight of polymer solids in the dispersion, a fatty acid dispersant of 14 to 60 carbon atoms with an acid value in the range of 60 to 250;

ii) from greater than 25 weight percent to less than 70 weight percent, based on the weight of polymer solids in the dispersion, an acid functionalized propylene base copolymer with an acid value in the range of 0.5 to 20 and a melting point at or above 130° C. as determined by DSC;

iii) 15 to 60 weight percent, based on the weight of polymer solids in the dispersion, a non-functionalized propylene-co-alkene base copolymer;

iv) 2 to 15 weight percent, based on the weight of polymer solids in the dispersion, a functionalized polyolefin wax with an acid value in the range of 25 to less than 60;

v) a neutralizing agent which is an organic base or volatile base having a boiling point of less than 250° C.;

vi) 5 to 30 weight percent, based on the weight of polymer solids in the dispersion, an acid functionalized polyolefin dispersant copolymer with a molecular weight of at least 10,000, as determined by GPC and an acid value between 60 and 250; and vii) water; and b) curing the composition by heating or allowing the composition to set to produce a cured film having a thickness in the range of 1 μm to 20 μm.

11. A metal coated article made according to the process of claim 10.

* * * * *